United States Patent
Kaltschmidt et al.

(10) Patent No.: US 10,787,149 B2
(45) Date of Patent: Sep. 29, 2020

(54) VEHICULAR SHOULDER BELT OUTLET TRIM ASSEMBLY

(71) Applicant: Lear Corporation, Southfield, MI (US)

(72) Inventors: Uwe Kaltschmidt, Sindelfingen (DE); Ian Gamiao, Sindelfingen (DE); Harald Fischer, Sindelfingen (DE)

(73) Assignee: Lear Corporation, Southfield, MI (US)

( * ) Notice: Subject to any disclaimer, the term of this patent is extended or adjusted under 35 U.S.C. 154(b) by 37 days.

(21) Appl. No.: 16/224,248

(22) Filed: Dec. 18, 2018

(65) Prior Publication Data
US 2019/0202396 A1    Jul. 4, 2019

(30) Foreign Application Priority Data

Dec. 28, 2017    (DE) .................... 20 2017 107 933 U (51) Int. Cl.
| | |
|---|---|
| *B60R 22/00* | (2006.01) |
| *B60R 22/26* | (2006.01) |
| *B60N 2/00* | (2006.01) |
| *B60N 2/58* | (2006.01) |
| *B60R 22/18* | (2006.01) |

(52) U.S. Cl.
CPC ............ *B60R 22/26* (2013.01); *B60N 2/00* (2013.01); *B60N 2/58* (2013.01); *B60R 2022/1818* (2013.01)

(58) Field of Classification Search
CPC .. B60N 2/2821; B60N 2/2851; B60N 2/4221; B60N 2002/2815; B60N 2/688; B60R 22/26; B60R 2022/1818
See application file for complete search history.

(56) References Cited

U.S. PATENT DOCUMENTS

| | | | |
|---|---|---|---|
| 4,431,233 A | 2/1984 | Ernst | |
| 5,123,673 A | 6/1992 | Tame | |
| 5,390,982 A * | 2/1995 | Johnson | ................. B60R 22/20 297/410 |
| 5,547,259 A | 8/1996 | Fredrick | |
| 5,599,070 A * | 2/1997 | Pham | ..................... B60R 22/26 280/808 |
| 5,645,316 A * | 7/1997 | Aufrere | ................ B60N 2/2222 297/216.13 |
| 5,658,051 A * | 8/1997 | Vega | ...................... B60R 22/26 280/808 |

(Continued)

FOREIGN PATENT DOCUMENTS

| | | |
|---|---|---|
| EP | 0590237 A1 | 4/1994 |
| JP | H07156750 A | 6/1995 |

(Continued)

OTHER PUBLICATIONS

"Head Impact Protection Device", Research Disclosure, Sep. 1999, pp. 1-4, Research Disclosure database No. 425054.

*Primary Examiner* — Shin H Kim
(74) *Attorney, Agent, or Firm* — MacMillan, Sobanski & Todd, LLC (57) ABSTRACT

A vehicle seat has a seat back with a top edge. A cover mount is attached to the seat back adjacent to the top edge. An outlet trim is attached to the cover mount. The cover mount includes a belt guide that is configured to accommodate a shoulder belt. The outlet trim includes a trim belt outlet that is aligned with the belt guide and is configured to allow the shoulder belt to pass through the outlet trim.

20 Claims, 7 Drawing Sheets

(56) References Cited

U.S. PATENT DOCUMENTS

| | | | | |
|---|---|---|---|---|
| 5,716,073 A * | 2/1998 | Redman | B60R 22/26 | |
| | | | 280/801.1 | |
| 5,722,732 A * | 3/1998 | Haldenwanger | B60R 22/18 | |
| | | | 297/483 | |
| 5,823,627 A * | 10/1998 | Viano | B60N 2/688 | |
| | | | 297/471 | |
| 5,988,758 A * | 11/1999 | Heintzelman | B60R 22/26 | |
| | | | 297/473 | |
| 6,398,291 B1 | 6/2002 | Reusswig et al. | | |
| 6,637,825 B2 | 10/2003 | Janz | | |
| 6,817,672 B2 | 11/2004 | Matsunuma | | |
| 7,497,521 B2 | 3/2009 | Whalen et al. | | |
| 7,510,245 B2 | 3/2009 | Okazaki et al. | | |
| 7,635,167 B2 * | 12/2009 | Okazaki | B60N 2/688 | |
| | | | 280/808 | |
| 8,480,180 B2 * | 7/2013 | Titz | B60R 22/20 | |
| | | | 280/808 | |
| 8,820,790 B2 * | 9/2014 | Wenz | B60R 22/26 | |
| | | | 280/808 | |
| 2003/0160498 A1 * | 8/2003 | Boelstler | B60R 22/26 | |
| | | | 297/483 | |
| 2012/0248846 A1 * | 10/2012 | Titz | B60R 22/20 | |
| | | | 297/473 | |
| 2019/0202396 A1 * | 7/2019 | Kaltschmidt | B60N 2/58 | |

FOREIGN PATENT DOCUMENTS

| | | |
|---|---|---|
| JP | H1044930 A | 2/1998 |
| JP | H11278214 A | 10/1999 |
| JP | 2006143215 A | 6/2006 |

* cited by examiner

VEHICULAR SHOULDER BELT OUTLET TRIM ASSEMBLY

BACKGROUND OF THE INVENTION

This invention relates in general to vehicular occupant restraint systems. In particular, this invention relates to an improved structure for an outlet trim assembly for a vehicular shoulder belt.

Vehicle occupant restraint systems, including seat and shoulder belt devices, are important and well known components of many vehicle safety systems. The most common type of passenger restraint system is a safety belt system having a lap belt and a shoulder belt that can be withdrawn from a retractor mechanism for latched engagement with an anchored buckle member. In some of such safety belt systems, the retractor mechanism for the shoulder belt is supported on a reinforced pillar of the vehicle, while the lap belt and buckle member are anchored on opposite lateral sides of the seat assembly to a reinforced floor structure. Current seat-mounted occupant restraint systems often locate the shoulder belt retractor on a frame of the seat and route the shoulder belt webbing upwardly along a rear portion of the seat back, with the seat belt exiting the seat at a top portion of the seat back. Typically, a rigid plastic component frames the shoulder belt opening on the top of the seat back.

SUMMARY OF THE INVENTION

This invention relates to a vehicle seat. The vehicle seat has a seat back with a top edge. A cover mount is attached to the seat back adjacent to the top edge. An outlet trim is attached to the cover mount. The cover mount includes a belt guide that is configured to accommodate a shoulder belt. The outlet trim includes a trim belt outlet that is aligned with the belt guide and is configured to allow the shoulder belt to pass through the outlet trim.

In another embodiment, the invention relates to a vehicle seat with a seat back frame. A cover mount is attached to the seat back frame. The cover mount includes a mount base. A plurality of ribs extend from the mount base and are located between the mount base and the seat back frame. A table is attached to the mount base. A table space is between the table and the mount base. An outlet trim has an outlet body. Side walls extend from the outlet body and define an outlet space. An outlet mount is located within the outlet space and is attached to the table.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
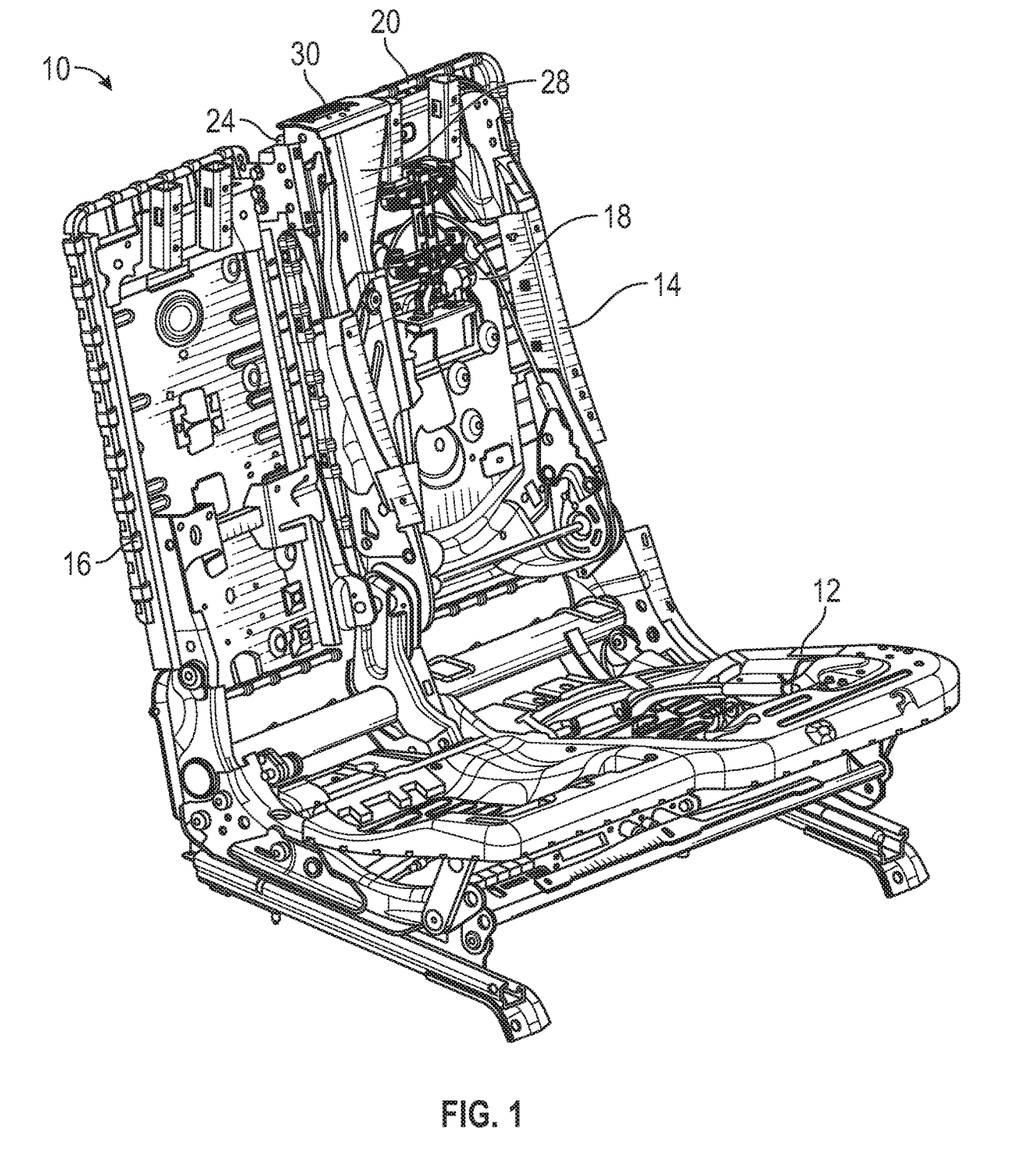
FIG. 1 is a perspective view of a vehicle seat frame.

Referring now to the drawings, there is illustrated in FIG. 1 a perspective view of a portion of a vehicle seat frame, indicated generally at 10. The illustrated seat frame 10 includes a seat bottom 12 and a seat back 14. The illustrated seat frame 10 also includes a center portion 16 that is rotatable relative to the seat bottom 12 and the seat back 14. The illustrated seat frame 10 is made primarily of metal components, although such is not required. In normal use, the seat frame 10 is installed in a passenger vehicle and support a foam (not shown) and a trim (not shown), and can be used for the seating of multiple occupants of a vehicle. The sea t frame 10 is provided for illustrative purposes, and the invention described may be used with any desired frame. The seat back 14 includes an A-surface 18, which is the side of the seat back 14 that faces the occupant of the seat.

Figure 2:
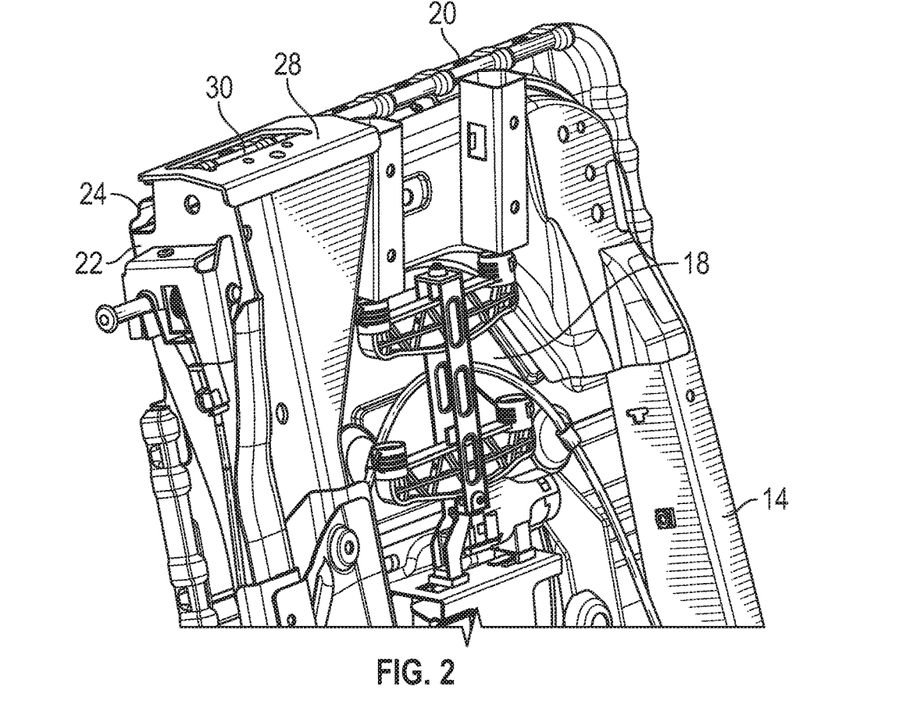
FIG. 2 is an enlarged view of a portion of the vehicle seat frame illustrated in FIG. 1.
Figure 3:
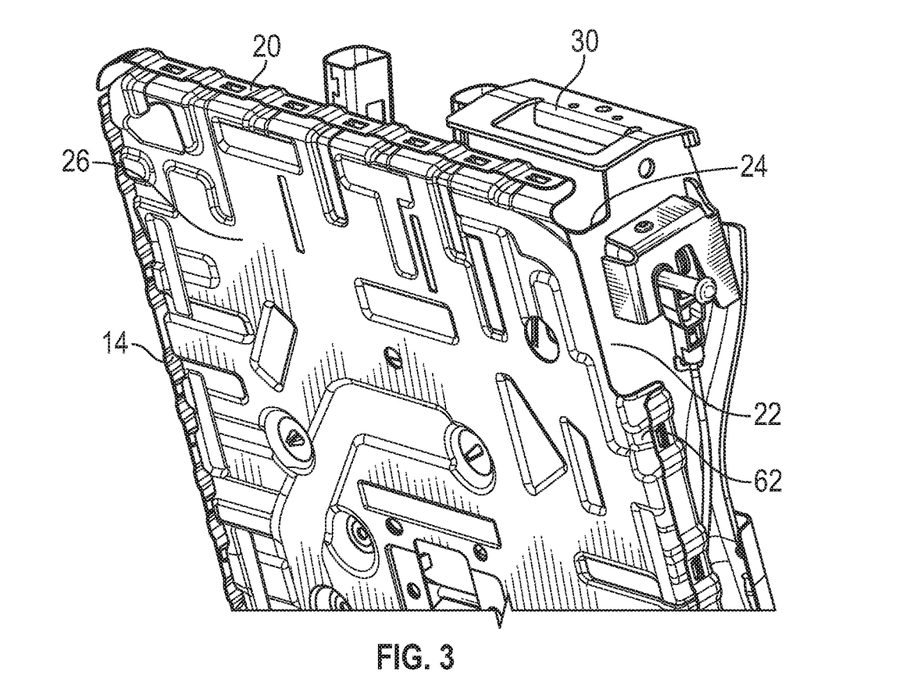
FIG. 3 is a rear perspective view of the portion of the vehicle seat frame illustrated in FIG. 2.

Referring to FIG. 2, there is illustrated an enlarged view of a portion of the seat back 14, and FIG. 3 is a view of the same portion of the seat back 14 viewed from behind. The seat back 14 includes a top edge 20 and a side edge 22 that meet at a corner 24. The seat back 14 also includes a B-surface 26, which is the side of the seat back 14 opposite the A-surface 18. The B-surface 26 is the side of the seat back 14 that faces an occupant of a rear seat (not shown) located behind the seat frame 10 in the vehicle. The seat back 14 includes a belt housing 28. The belt housing 28 is provided to accommodate a mechanism for a shoulder belt (not shown) of a primary restraint or seat belt safety system. The belt housing 28 includes a housing outlet 30, which is an opening that allows a shoulder belt (not shown) to extend out of the belt housing 28.

Figure 4:
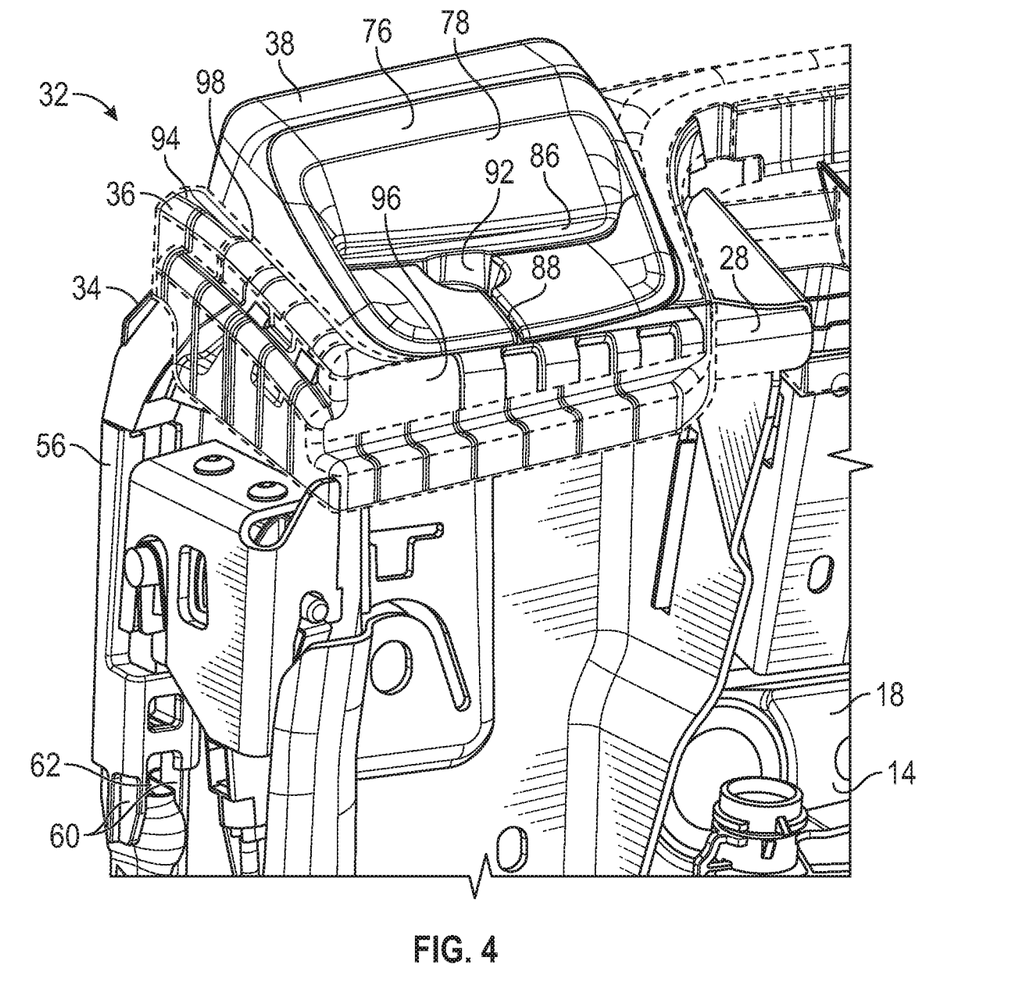
FIG. 4 is a further enlarged view of a portion of the vehicle seat frame illustrated in FIG. 2 showing a cover assembly attached to the seat frame.
Figure 5:
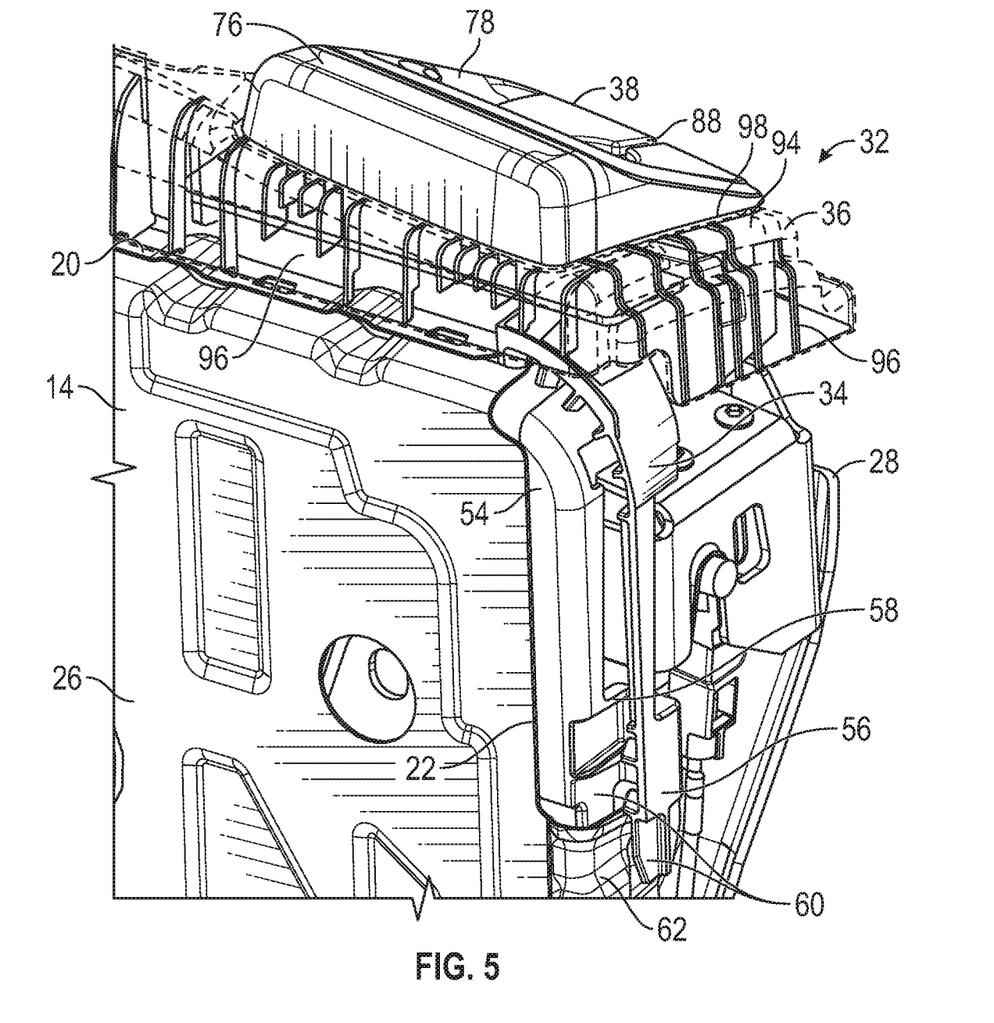
FIG. 5 is a rear perspective view of the portion of the vehicle seat frame illustrated in FIG. 3 showing the cover assembly attached to the seat frame.

Referring now to FIG. 4, there is shown a view similar to FIG. 2, with a cover assembly, indicated generally at 32, installed on the seat back 14. FIG. 5 is a view similar to FIG. 3, showing the seat frame 14 from behind with the cover assembly 32 installed. The cover assembly 32 includes a cover mount 34, a cover trim 36, and an outlet trim 38. The cover trim 36 is shown translucent so that underlying components are visible.

Figure 6:
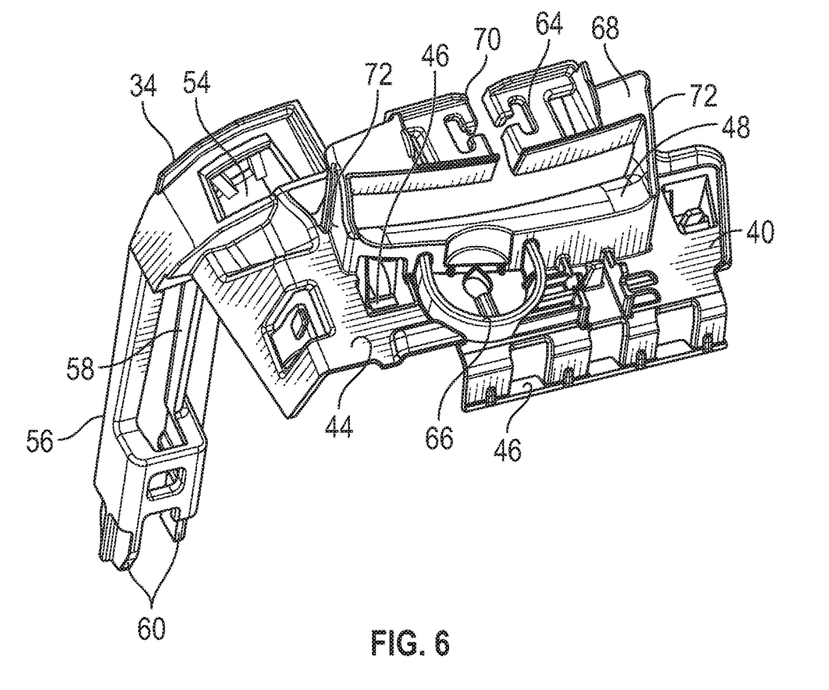
FIG. 6 is a perspective view, from above, of a cover mount portion of the cover assembly illustrated in FIGS. 4 and 5.
Figure 7:
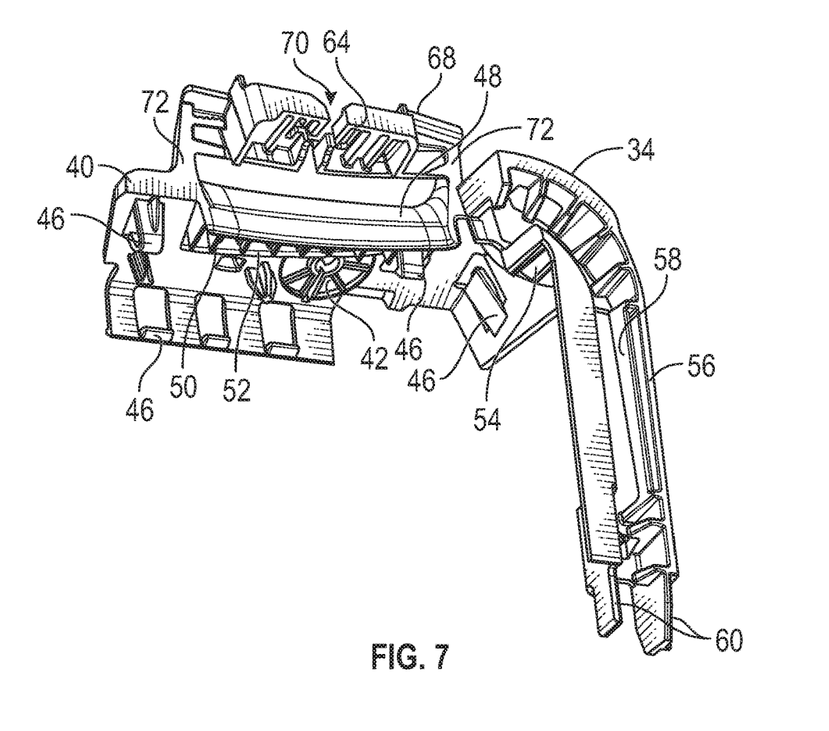
FIG. 7 is a perspective view, from below, of the cover mount portion of the cover assembly illustrated in FIG. 6.

Referring to FIG. 6, a perspective view of the cover mount 34 is illustrated, shown from the front and above. FIG. 7 illustrates a perspective view of the cover mount 34, shown from behind and below. The illustrated cover mount 34 is molded from plastic, but may be made from any desired material by any desired process. The cover mount 34 includes a mount base 40 that includes a frame side 42 and an opposed trim side 44. The cover mount 34 include mount locks 46 on the frame side 42 of the mount base 40. The illustrated mount locks 46 are resilient fingers that that molded as part of the cover mount 34, but may be formed in any desired manner.

When the cover mount 34 is attached to the seat back 14, the frame side 42 of the cover mount 34 is positioned facing the belt housing 28, and the mount locks 46 engage portions of the belt housing 28 to retain the cover mount 34 in position relative to the seat back 14. The illustrated cover mount 34 is configured to snap-fit onto the seat back 14, but may be attached by any desired method or connector.

The cover mount 34 includes a belt guide 48 that extends from the mount base 40 past the frame side 42. When the cover mount 34 is attached to the seat back 14, the belt guide 48 is aligned with the housing outlet 30 of the belt housing 28 and provides a smooth surface for the shoulder belt to slide over when moving in and out of the belt housing 28. The cover mount 34 includes a plurality of ribs 50 that extend from the frame side 42 of the mount base 40. The illustrated ribs 50 engage the belt guide 48. When the cover mount 34 is attached to the seat back 14, the ribs 50 are located between the mount base 40 and the seat back 14. The ribs 50 serve to maintain a mount space 52 between the mount base 40 and the seat back 14 and act as an energy absorption feature, as will be described below. The illustrated ribs 50 are molded as part of the cover mount 34, but may be a separate component if desired.

The cover mount 34 includes a shoulder 54 that is attached to the mount base 40 and a side extension 56 that is also attached to the shoulder 54. The mount base 40 and the side extension 56 extend generally perpendicularly to each other, but may have any desired relative orientations. When the cover mount 34 is attached to the seat back 14, the shoulder 54 is located adjacent to the corner 24 of the seat back 14 and the side extension 56 is located adjacent to the side edge 22. The side extension 56 includes a cover channel 58, the purpose of which will be described below. The side extension 56 includes alignment tabs 60 at the end thereof. As seen in FIG. 5, when the cover mount 34 is attached to the seat back 14, the alignment tabs 60 engage the seat back 14 to align the cover channel 58 with a frame channel 62 on the seat back 14. The purpose of the frame channel 58 will be described below. In the illustrated embodiment, the cover mount 34 includes two alignment tabs 60, located on opposed sides of the cover channel 58. However, the cover mount 34 may have any desired number of alignment tabs 60 in any desired locations.

Referring back to FIGS. 5 and 6, the cover mount 34 includes a first trim mount 64 and a second trim mount 66. In the illustrated embodiment, the first trim mount 64 and the second trim mount 66 are located on opposed sides of the belt guide 48. However, the trim mounts 64 and 66 may be in any desired locations. The first trim mount 64 is located on a table 68. The illustrated table 68 is divided into two sections that are separated by a table gap 70. The table 68 is connected to the mount base 40 by two arms 72, which are located on opposed sides of the belt guide 48. The arms 72 serve to provide a table space, indicated generally at 74, between the table 68 and the mount base 40. The arms 72 and the table gap 70 also serve to allow the first trim mount 64 to deflect relative to the mount base 40. The second trim mount 66 is located on the mount base 40, and is a substantially semi-circular space defined in the mount base 40.

Figure 8:
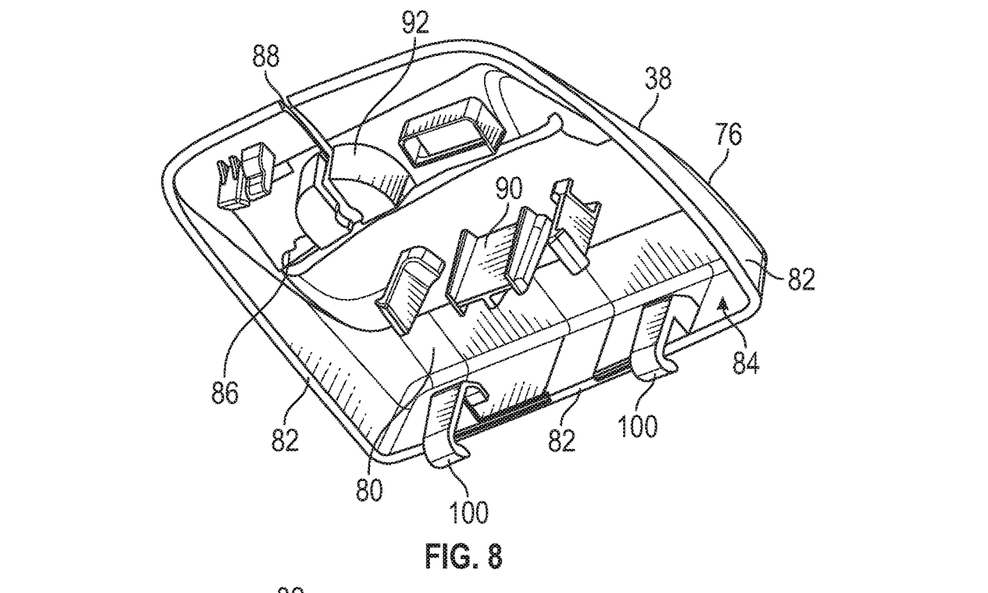
FIG. 8 is a perspective view, from below, of an outlet trim portion of the cover assembly illustrated in FIGS. 4 and 5.

Referring now to FIG. 8, there is illustrated a perspective view of the 38, taken from below. The illustrated outlet trim 38 is molded from plastic, but may be made from any desired material and by any desired process. The outlet trim 38 includes an outlet body 76 that has an upper finished surface 78 (shown in FIGS. 4 and 5) and a lower attachment surface 80 (shown in FIGS. 8 and 9). The outlet trim 38 has side walls 82 that extend from the outlet body 76 in the direction of the attachment surface 80 to define a wedge-shaped outlet space, indicated generally at 84, adjacent to the attachment surface 80. The outlet trim 38 includes a trim belt outlet 86 that extends through the outlet body 76. A trim split 88 extends from the trim belt outlet 86 to an edge of the outlet body 76.

The outlet trim 38 includes a first outlet mount 90 and second outlet mount 92 that extend from the outlet body 76 into the outlet space 84. In the illustrated embodiment, the first outlet mount 90 and the second outlet mount 92 are located on opposed sides of the trim belt outlet 86. However, the outlet mounts 90 and 92 may be in any desired locations. In the illustrated embodiment, the first outlet mount 90 includes a plurality of resilient arms. The illustrated first outlet mount 90 is molded as part of the outlet trim 38, but may be a separate component, if desired. The second outlet mount 90 is a substantially semi-circular extension from the outlet body 76. The illustrated second outlet mount 90 is molded as part of the outlet body 76, but may be a separate component, if desired. The illustrated second outlet mount 90 is split into two halves by the trim split 88.

Figure 9:
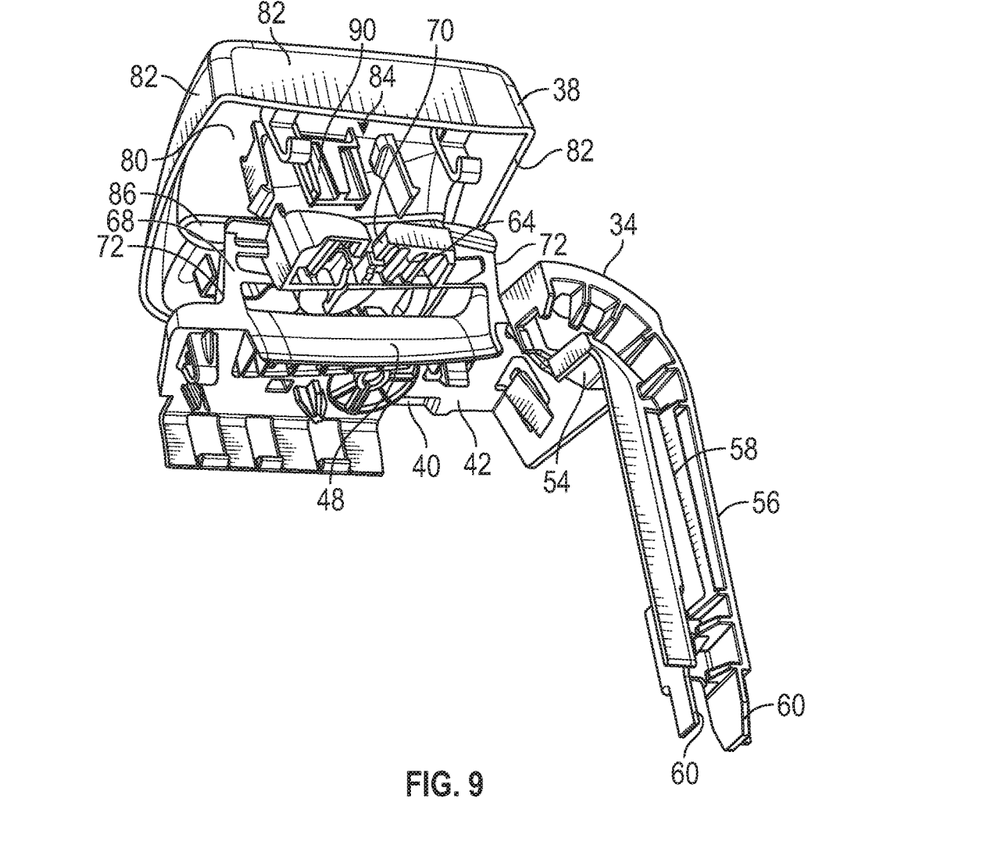
FIG. 9 is a perspective view, from below, of the cover mount and the outlet trim portions prior to being connected to each other.
Figure 10:
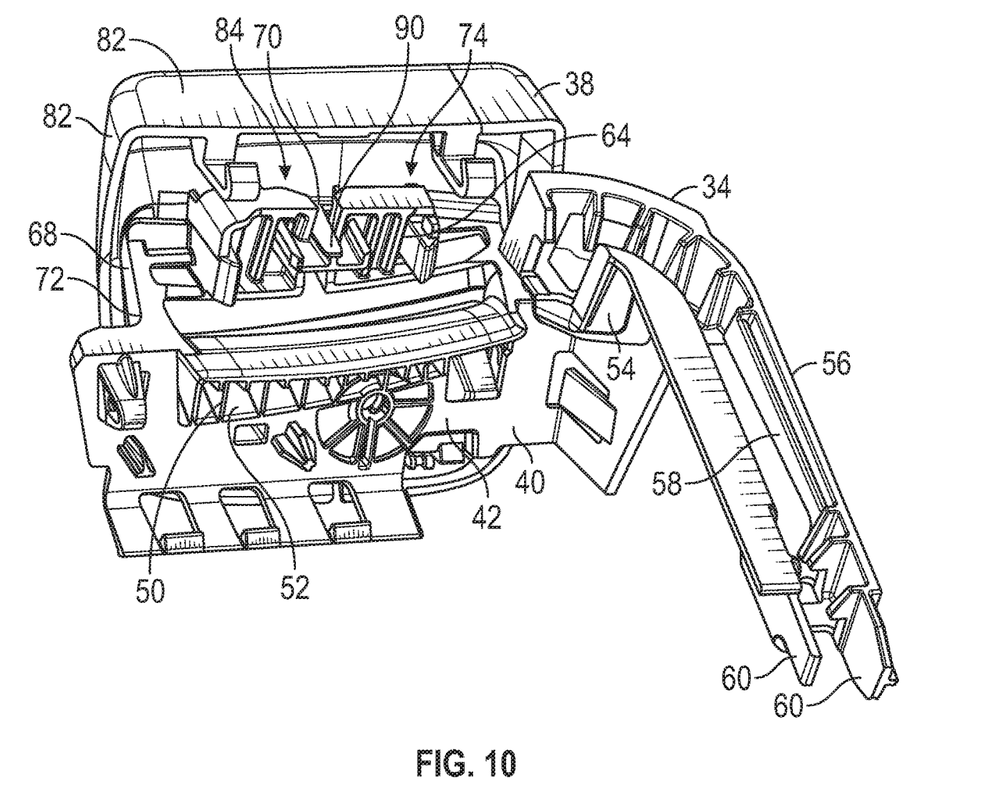
FIG. 10 is a view similar to FIG. 9, showing the cover mount and the outlet trim portions after being connected to each other.

Referring now to FIG. 9, there is illustrated a view similar to FIG. 7, showing the cover mount 34 and the outlet trim 38 prior to being connected to each other. FIG. 10 illustrates a view similar to FIG. 9, showing the cover mount 34 and the outlet trim 38 connected together. It will be appreciated that the cover mount 34 may be attached to the seat back 14 prior to connecting the outlet trim 38. Additionally, the cover trim 36 will normally be positioned between the cover mount 34 and the outlet trim 38 as will be described below. However, these other components are not shown in FIGS. 9 and 10 so that the attachment of the outlet trim 38 to the cover mount 34 is clearly visible.

To attach the outlet trim 38 to the cover mount 34, the first outlet mount 90 on the outlet trim 38 is mated with the first trim mount 64 on the cover mount 34, and the second outlet mount 92 on the outlet trim 38 is mated with the second trim mount 66 on the cover mount 34. The outlet trim 38 is then positioned with the trim belt outlet 86 aligned with the belt guide 48 on the cover mount 34. This allows the shoulder belt to extend from the belt housing 28, through the trim belt outlet 86. When the outlet trim 38 is attached to the seat back 14, the wedge-shaped outlet space indicated generally at 84 is positioned with the highest portion of the wedge toward the B-surface of the seat back 14 and the lowest portion of the wedge toward the A-surface of the seat back 14.

As previously-described, the cover trim 36 is located partially between the outlet trim 38 and the cover mount 34, as shown in FIGS. 4 and 5. The cover trim 36 serves, in part, to provide a bridge between the cover assembly 32 and the seat foam (not shown). The illustrated cover trim 36 is molded from plastic, but may be made of any desired material and by any desired process. The cover trim 36 includes a trim surface 94 and a plurality of trim walls 96 that extend therefrom to create a dome-shaped structure. The cover trim 38 includes a trim opening 98 in the trim surface 94, and an edge of the trim surface 94 surrounding the trim opening 98 is located between the cover mount 34 and the outlet trim 38. Referring back to FIG. 8, the outlet trim 38 includes a plurality of trim attachments 100 that extend in the outlet space 84. When the cover assembly 32 is assembled (as shown in FIGS. 4 and 5), the trim attachments engage the cover trim 36 to retain the outlet trim 38 in position relative to the cover trim 36.

Figure 11:
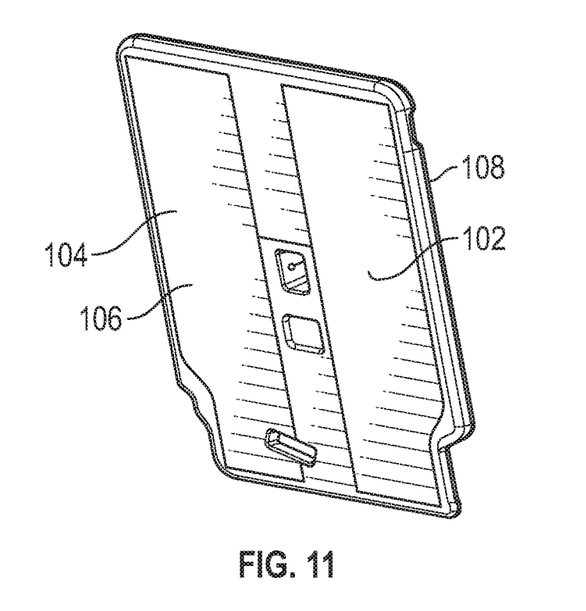
FIG. 11 is a perspective view, from behind, of a seat back trim portion that is attached to the seat frame when the seat is fully assembled.

Referring now to FIG. 11, there is illustrated a perspective view of a seat back trim 102. The illustrated seat back trim 102 is molded from plastic, but may be made of any desired material and by any desired process. The seat back trim 102 is positioned on the B-surface of the seat back 14 when the seat is assembled. The seat back trim 102 includes a trim body 104 with a finished surface 106 that faces the rear seat occupant and provides a finished appearance for the assembled seat. The seat back trim 102 includes a lip 108 that extends from the trim body 104 toward the seat back 14. When the seat back trim 102 is attached to the seat back 14, a portion of the lip 108 is positioned in the cover channel 58 on the cover mount 34 and a portion of the lip 108 is positioned in the frame channel 62 on the seat back 14. This helps to provide a finished appearance to the assembled seat.

Referring back to FIG. 5, it should be appreciated that in the event of a sudden stop of the vehicle, the rear seat occupant may be propelled forward into the seat back 14. The seat frame 10 is relatively rigid, and it is desirable to reduce the force of any impact with the seat frame 10 and the seat back 14. The cover assembly 32 is positioned between the rear seat occupant and the seat back 14 and includes features to help dissipate impact energy. The rear seat occupant will come into contact with the cover assembly 32 before impacting the seat back 14, and the features of the cover assembly 32 allow the components of the cover assembly 32 to deflect and deform in order to dissipate energy and decelerate the rear seat occupant.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat comprising:
 a seat back having a top edge;
 a cover mount attached to the seat back adjacent to the top edge; and
 an outlet trim attached to the cover mount;
 the cover mount including a belt guide configured to accommodate a shoulder belt, and the outlet trim including a trim belt outlet aligned with the belt guide and configured to allow the shoulder belt to pass through the outlet trim; wherein either:
 (1) a cover trim is located adjacent to the top edge of the seat back, and a portion of the cover trim is located between the cover mount and the outlet trim; or
 (2) the outlet trim includes an outlet body and side walls that extend from the outlet body to define an outlet space between the outlet trim and the cover mount; or
 (3) the cover mount includes a mount base that is attached to the seat back and a plurality of ribs that extend from the mount base and are located between the mount base and the seat back; or
 (4) the cover mount includes a mount base that is attached to the seat back, and the cover mount is attached to the seat back so that a mount space is between the mount base and the seat back; or
 (5) the outlet trim has a wedge shape, a highest portion of the wedge is positioned toward a B-surface of the seat back, and a lowest portion of the wedge shape is positioned toward an A-surface of the seat back; or
 (6) the cover mount includes a side extension that is located adjacent to a side edge of the seat back.

2. The vehicle seat of claim 1, further comprising a cover trim located adjacent to the top edge of the seat back, wherein a portion of the cover trim is located between the cover mount and the outlet trim.

3. The vehicle seat as defined in claim 1 wherein the outlet trim includes an outlet body and side walls that extend from the outlet body to define an outlet space between the outlet trim and the cover mount.

4. The vehicle seat as defined in claim 3 wherein the outlet trim includes an outlet mount that extends from the outlet body into the outlet space.

5. The vehicle seat as defined in claim 3, wherein the cover mount includes a mount base that is attached to the seat back and a table that is attached to the mount base with a table space therebetween, wherein the outlet trim is attached to the table of the cover mount.

6. The vehicle seat as defined in claim 5, wherein the cover mount includes a plurality of ribs that extend from the mount base and are located between the mount base and the seat back.

7. The vehicle seat as defined in claim 5, wherein the cover mount is attached to the seat back so that a mount space is maintained between the mount base and the seat back.

8. The vehicle seat as defined in claim 1, wherein the cover mount includes a mount base that is attached to the seat back and a plurality of ribs that extend from the mount base and are located between the mount base and the seat back.

9. The vehicle seat as defined in claim 1, wherein the cover mount includes a mount base that is attached to the seat back and the cover mount is attached to the seat back so that a mount space is maintained between the mount base and the seat back.

10. The vehicle seat as defined in claim 1 wherein the outlet trim has a wedge shape, wherein a highest portion of the wedge is positioned toward a B-surface of the seat back and a lowest portion of the wedge shape is positioned toward an A-surface of the seat back.

11. The vehicle seat as defined in claim 1 wherein the cover mount includes a side extension that is located adjacent to a side edge of the seat back.

12. The vehicle seat as defined in claim 11 wherein the cover mount includes a mount base that is attached to the seat back and a shoulder that is connected to the mount base and the side extension, the shoulder located adjacent to a corner of the seat back.

13. The vehicle seat as defined in claim 12, wherein the cover mount includes a trim channel on the side extension, the trim channel adapted to engage a lip of a back trim.

14. A vehicle seat comprising:
 a seat frame;
 a cover mount attached to the seat frame, the cover mount including a mount base, a plurality of ribs that extend from the mount base and are located between the mount base and the seat frame, and a table attached to the mount base with a table space between the table and the mount base; and
 an outlet trim including an outlet body and side walls that extend from the outlet body to define an outlet space and an outlet mount that is located within the outlet space and is attached to the table of the cover mount.

15. The vehicle seat of claim 14, wherein the seat back frame includes a belt housing with a housing outlet that is adapted to allow a shoulder belt to extend from the belt housing, wherein the cover mount includes a belt guide that extends from the mount base into the housing outlet, and wherein the outlet trim includes a trim belt outlet that extends through the outlet body and is adapted to allow the shoulder belt to extend therethrough.

16. The vehicle seat of claim 15, wherein the ribs on the cover mount engage the belt guide.

17. The vehicle seat of claim 15, wherein the cover mount includes a shoulder attached to the mount base and a side extension that extends from the shoulder generally perpendicular to the mount base, the side extension being located adjacent to a side edge of the seat frame.

18. The vehicle seat of claim 17, wherein the cover mount includes a trim channel on the side extension, the trim channel being adapted to engage a lip of a back trim.

19. The vehicle seat of claim 15, wherein the table is divided into two sections that are separated by a table gap and the outlet trim is attached to each section of the table.

20. The vehicle seat of claim 15, further comprising a cover trim located adjacent to a top edge of the seat back, wherein a portion of the cover trim is located between the cover mount and the outlet trim.

* * * * *

UNITED STATES PATENT AND TRADEMARK OFFICE
CERTIFICATE OF CORRECTION

PATENT NO. : 10,787,149 B2
APPLICATION NO. : 16/224248
DATED : September 29, 2020
INVENTOR(S) : Uwe Kaltschmidt, Ian Gamiao and Harald Fischer It is certified that error appears in the above-identified patent and that said Letters Patent is hereby corrected as shown below:

In the Claims

Column 6, Claim 15, Line 63, correct:
"wherein the seat back"
To:
--wherein the seat--

Signed and Sealed this
First Day of December, 2020

Andrei Iancu
*Director of the United States Patent and Trademark Office*